US012091243B2

(12) United States Patent
Arushanyan et al.

(10) Patent No.: US 12,091,243 B2
(45) Date of Patent: Sep. 17, 2024

(54) AUTOMATIC RECEPTACLE LID LOCK

(71) Applicant: San Diego State University (SDSU) Foundation, San Diego, CA (US)

(72) Inventors: David Arushanyan, San Diego, CA (US); Jacob Hoppe, San Diego, CA (US); Hector Cea, San Diego, CA (US); Collin Vizina, San Diego, CA (US)

(73) Assignee: San Diego State University (SDSU) Foundation, San Diego, CA (US)

( * ) Notice: Subject to any disclaimer, the term of this patent is extended or adjusted under 35 U.S.C. 154(b) by 265 days.

(21) Appl. No.: 17/807,329

(22) Filed: Jun. 16, 2022

(65) Prior Publication Data

US 2022/0402691 A1 Dec. 22, 2022

Related U.S. Application Data

(60) Provisional application No. 63/211,333, filed on Jun. 16, 2021.

(51) Int. Cl.
*B65F 1/16* (2006.01)
*E05B 15/00* (2006.01)

(52) U.S. Cl.
CPC .......... *B65F 1/1615* (2013.01); *B65F 1/1623* (2013.01); *E05B 15/0093* (2013.01)

(58) Field of Classification Search
CPC ............. E05B 15/0093; E05B 65/5292; B65F 1/1615; B65F 1/1623
USPC ................ 292/106, 203, 207, 230, 231, 238
See application file for complete search history.

(56) References Cited

U.S. PATENT DOCUMENTS 15,857 A * 10/1856 Redmond ................ E05C 3/30 292/132
4,182,530 A * 1/1980 Hodge .................... E05C 3/048 220/228
5,114,194 A * 5/1992 Toifl ........................ E05C 19/18 292/DIG. 28
5,171,119 A * 12/1992 Carson .................. B65F 1/1484 414/408
9,856,058 B1 * 1/2018 Arthurs ...................... E05F 1/02
10,221,010 B2 * 3/2019 Reeb ...................... B65F 1/1615
2016/0159570 A1 * 6/2016 Reeb ................... E05B 17/2034 292/197
2017/0069154 A1 * 3/2017 Hilton ...................... E05B 71/00

FOREIGN PATENT DOCUMENTS

WO WO-2017031510 A1 * 2/2017

* cited by examiner

*Primary Examiner* — Christine M Mills
*Assistant Examiner* — Peter H Watson
(74) *Attorney, Agent, or Firm* — Gregory P. Einhorn; Greer, Burns & Crain, Ltd.

(57) ABSTRACT

A lock for a lid of a receptacle such as a trash can comprises a gravity pin, a torsion spring, a lower pin, and a latch. The lock can be mounted to the receptacle and lid. The gravity pin and latch operate to substantially prevent the receptacle lid from inadvertently opening, while automatically allowing the lid to open when the receptacle is inverted. Also provided are lids and receptacles comprising lid locks as provided herein.

16 Claims, 20 Drawing Sheets

AUTOMATIC RECEPTACLE LID LOCK

CROSS-REFERENCE TO RELATED APPLICATIONS

This application claims priority to and the benefit of U.S. Provisional Patent Application Ser. No. 63/211,333, filed Jun. 16, 2021, which application is incorporated in its entirety by reference herein.

FEDERALLY SPONSORED RESEARCH OR DEVELOPMENT

N/A

FIELD

The present disclosure relates generally to the field of containers and associated devices. Embodiments of the invention relate more particularly to an apparatus for locking a lid of a receptacle, e.g., a trash can.

BACKGROUND

Waste receptacles, such as trash cans or trash bins, typically are not built to remain standing in high wind conditions. High winds cause them to knock over and spill out their contents (e.g., refuse) into the environment, causing a large mess. Moreover, lightweight and unbagged recyclables are blown everywhere in high winds, which can have other undesirable effects, including safety hazards.

For instance, an airport or air base can experience high speed winds knocking over trash cans on or near the premises. The trash cans can open, spreading their contents throughout the area. This results in significant cleanup and drain repair costs, and can potentially damage the aircraft.

U.S. Pat. No. 5,738,395 discloses a trash can locking device that is screwed into place on the trash can. This device has various shortcomings. One shortcoming is that the disclosed retaining solution is invasive. If it is not possible to alter the bins, such as when refuse company does not allow any sort of alterations made to their bins, screwing anything in place on the trash bin as disclosed in the ’395 patent typically would not be acceptable. Another issue is that if the bin were to fall forward on its face, the lid would be free to open, causing the contents to spill.

There is a need to provide a receptacle lid locking device for a lid on a receptacle such as a trash can so that the lid can stay secured when tipped over, e.g., in high wind conditions. There is also a need for a receptacle lid locking device to be user friendly for allowing easy emptying of the receptacle (e.g., by a refuse company). There is a further need to provide a device that can be made compliant with various receptacles where possible. There is a still further need for a receptacle that can withstand and work in extreme weather conditions.

There is a further need in the art to provide a receptacle lid locking device that resists opening of the lid if the receptacle were knocked over in the different directions the receptacle can fall (forwards, backwards, or side-to-side), while automatically allowing the lid to open when intentionally picked up, e.g., by the refuse collection company.

SUMMARY

According to an aspect of the disclosed embodiments, a lock for a lid of a receptacle such as a trash can comprises: a gravity pin (such as but not limited to sliding pin or locking pin); a torsion spring; a lower pin; and a latch. The latch includes a cutout for accommodating the gravity pin. The latch protrudes outwards to hold the lock to the receptacle and retain the lid in a closed (shut) position on the receptacle unless the gravity pin is moved.

According to another aspect of the disclosed embodiments, a lock for a lid of a receptacle such as a trash can comprises: a shroud; a gravity pin (such as but not limited to a sliding pin or locking pin); a frame (or mount), including right and left portions that are assembled to one another; one or more torsion springs; a lower pin; and a latch. The shroud is attached to the frame (or mount) to cover the gravity pin, and an outer portion of the lid lock is provided by the protective shroud, which substantially encases locking and mounting portions of the lock including the frame (or mount), gravity pin, torsion springs, and latch. The assembled frame includes an upper frontward projecting surface and a frontward projecting lower lip or hook (e.g., a lower lip). The lower lip wraps around the front lip of the receptacle lid. The projecting surface extends further frontward than the front lip and at least partially over a top surface of the lid, and includes an opening for accommodating a weather resistant strap. The frame (or mount) includes an extrusion having a pin slot for accepting the gravity pin, and another extrusion prevents the latch from swinging inwards but allows the gravity pin to slide open. The latch includes a cutout for accommodating the gravity pin. The latch is attached to the frame and protrudes outwards to hold the lock to the receptacle and retain the lid in a closed (shut) position on the receptacle. In some embodiments, the shroud, frame, gravity pin, and/or the latch may be 3D printed.

According to other aspects of the disclosed embodiments, a method for operating the lid lock according to any of the above comprises: mounting the lid lock to a receptacle; and performing one or more of: pressing the latch, moving the gravity pin and allowing the lid to open instead of being held closed by the latch; or lifting the receptacle to invert it in the direction of the front of the receptacle, wherein the gravity pin in the assembled lock is only allowed to move one direction moves out of the way from keeping the latch closed, whereby the latch now has no force keeping it fixed in one position.

According to other aspects of the disclosed embodiments, a method for operating the lid lock according to any of the above comprises: mounting the lid lock to a receptacle; and performing one or more of: pressing the latch, moving the gravity pin and allowing the lid to open instead of being forced to hold the lid closed; or lifting the receptacle is lifted to invert it in the direction of the front of the receptacle, wherein the gravity pin in the assembled lock is only allowed to swing one direction to moves out of the way from keeping the latch closed. whereby the latch now has no force keeping it fixed in one position; or pressing the latch to move the gravity pin is moved out of the way, allowing the latch to swing open.

According to other aspects of the disclosed embodiments, a method for manufacturing a lock for a lid of a receptacle (such as but not limited to a trash can) comprises: rotatingly coupling a latch to a frame/mount via a lower pin; coupling a torsion spring to the latch; and positioning a gravity pin (sliding pin, or locking pin) within a cutout of the latch. The latch protrudes outwards to hold the lock to the receptacle and retain the lid in a closed (shut) position on the receptacle unless the gravity pin is moved.

Also provided are lids and receptacles comprising lid locks as provided herein.

Various examples are disclosed herein.

The details of one or more exemplary embodiments of the invention are set forth in the accompanying drawings and the description below. Other features, objects, and advantages of the invention will be apparent from the description and drawings, and from the claims.

All publications, patents, patent applications cited herein are hereby expressly incorporated by reference in their entireties for all purposes.

DESCRIPTION OF THE DRAWINGS

The drawings set forth herein are illustrative of exemplary embodiments provided herein and are not meant to limit the scope of the invention as encompassed by the claims.

The present disclosure will become more fully understood from the detailed description and the accompanying drawings, wherein.

In the drawings, reference numbers may be reused to identify similar and/or identical elements.

DETAILED DESCRIPTION

Example lid locks provided herein can attach to receptacle lids, e.g., lids for plastic residential trash can or trash bins, so that the lids remain closed in various conditions and environments. For instance, environments such as (but not limited to) cities can experience very high wind conditions, causing trash cans on city streets to blow over, spilling trash everywhere.

An example lid lock is configured to keep the receptacle lid shut, disallowing any receptacles to spill out unintentionally. However, the lid still can open deliberately when the trash can is intentionally flipped upside down, for instance when a refuse company flips the receptacle to dump the trash from the receptable into their trucks. The example lid lock can be attached to the receptable so that it does not come off unless intentionally removed.

Example lid locks can keep receptacle lids closed and secured as needed. An outer shroud can protect the lock. For instance, the shroud can be configured and disposed for preventing the lid lock from undergoing deleterious effects from outside conditions including high wind speeds, extreme cold temperature, heavy snow and rain, and potential freezing of components due to moisture and cold temperatures.

Example embodiments can provide, among other things, a lid lock for a receptable lid, e.g., a trash can lid lock that is easy to use, non-invasive, and can open automatically when the receptacle is fully inverted but not, for example, when it tips on its side.

An example lid lock relies on a combination of gravity and springs to operate. A gravity latch mechanism including a gravity pin and a latch is used in example embodiments. This gravity latch mechanism can be self-applied with no user input and self-released when being tipped over, e.g., by a refuse company. An example gravity pin can be embodied in a sliding pin or a locking pin to allow for automatic release when dumping and automatic locking when the receptacle lid is shut. An example spring mechanism, e.g., including a torsion spring, further provides a strong ability to self-apply.

Example lid locks can allow for a flexible (e.g., substantially universal) mounting and fit for various receptacle configurations, without the need to modify the receptacle. Further, example lid locks provide the typically competing benefits of opening when dumped, yet staying closed when tipped. An example angled (e.g., 30 degree angled) pin in example receptable lid locks allows for a smooth dumping procedure.

Preferred embodiments will now be discussed with respect to the drawings. The drawings include schematic figures that are not to scale, which will be fully understood by skilled artisans with reference to the accompanying description. Features may be exaggerated for purposes of illustration. From the preferred embodiments, artisans will recognize additional features and broader aspects of the invention.

Figure 1A:
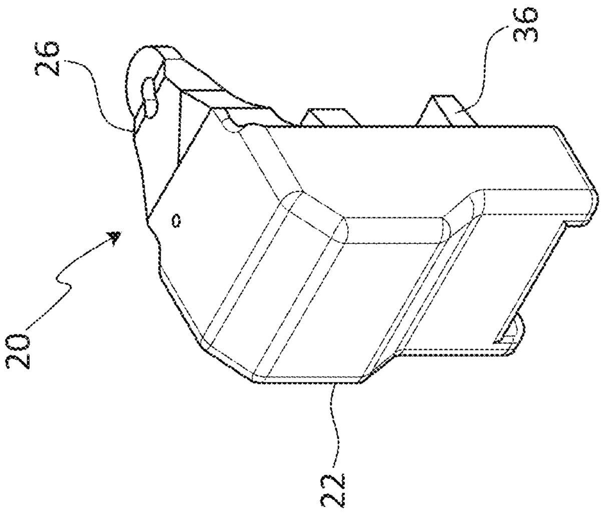
FIGS. 1A-1D show a rear perspective view, a left side view, a rear elevated view and a right side view, respectively, of an example receptacle lid lock according to an example embodiment.
Figure 1B:
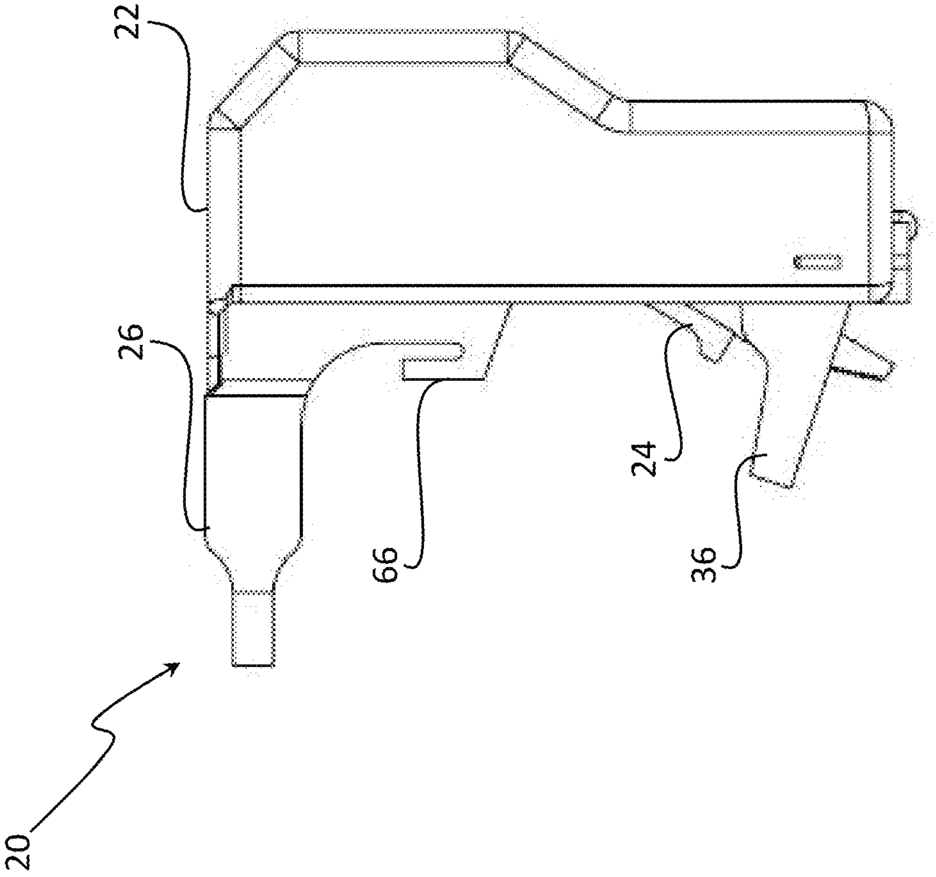
Figure 1C:
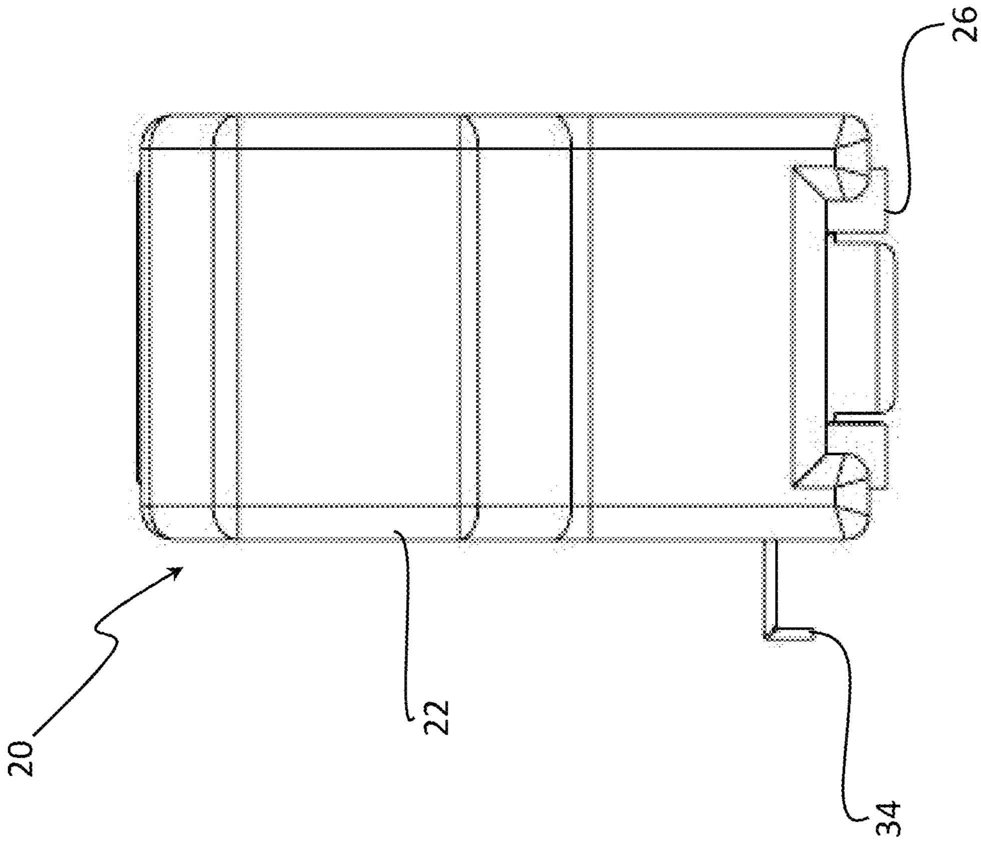
Figure 1D:
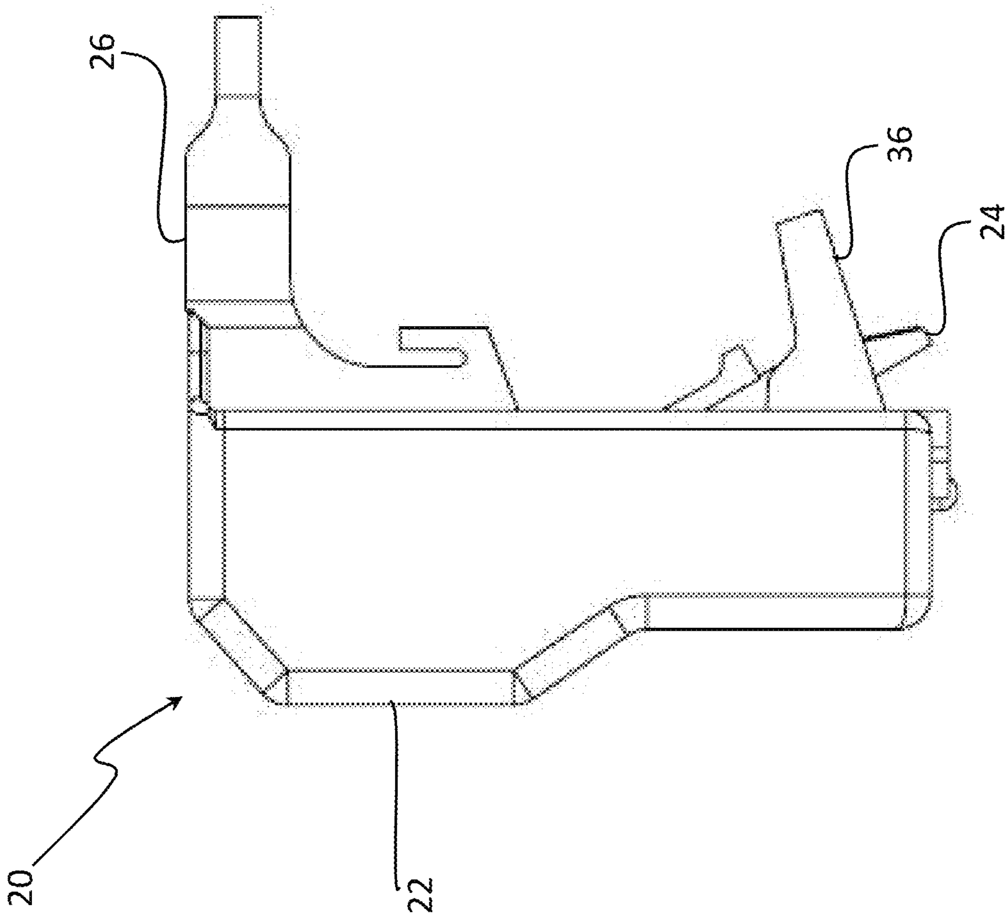
Figure 2:
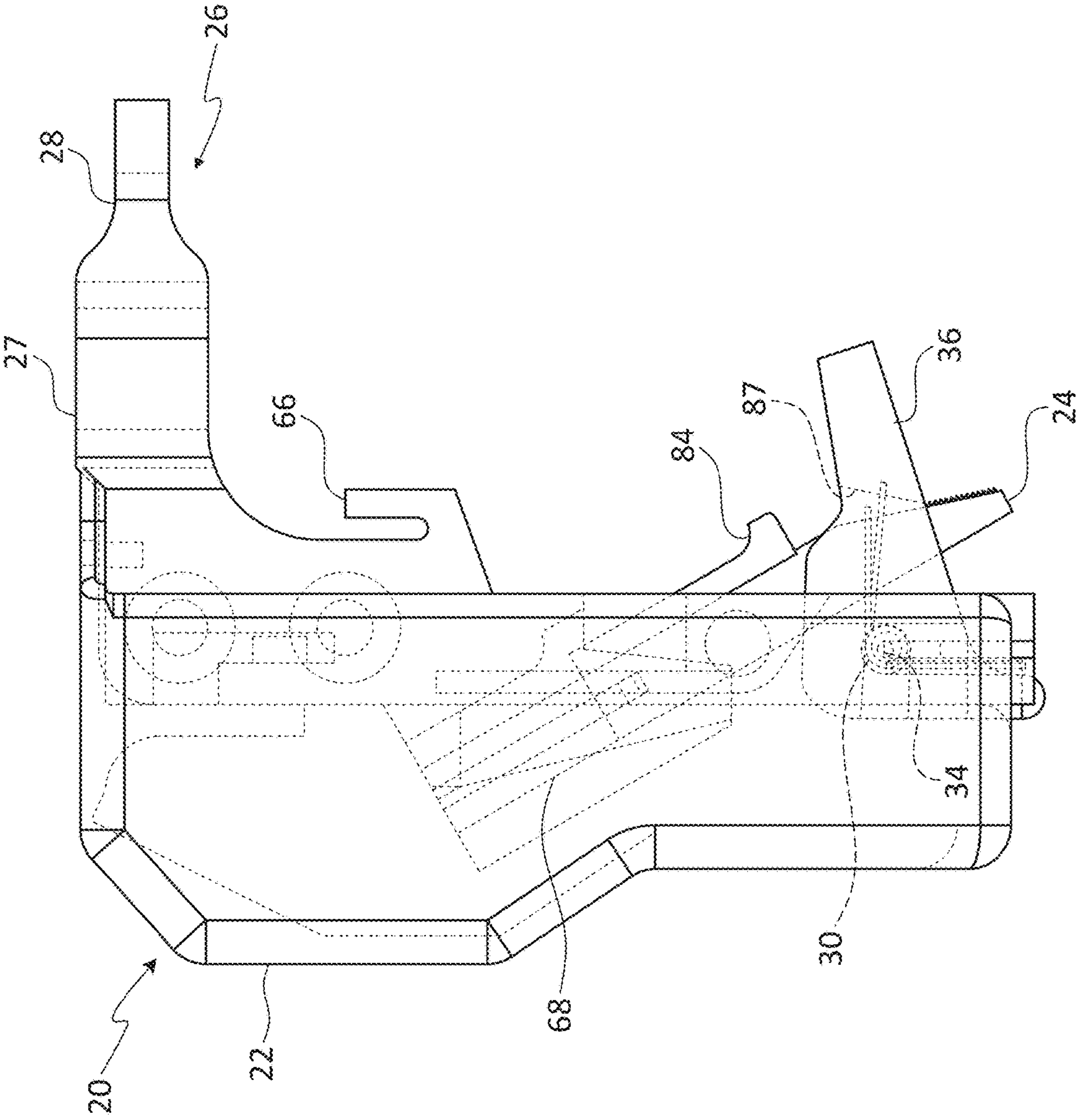
FIG. 2 is an enlarged phantom right side view of the receptacle lid lock of FIGS. 1A-1D.
Figure 3:
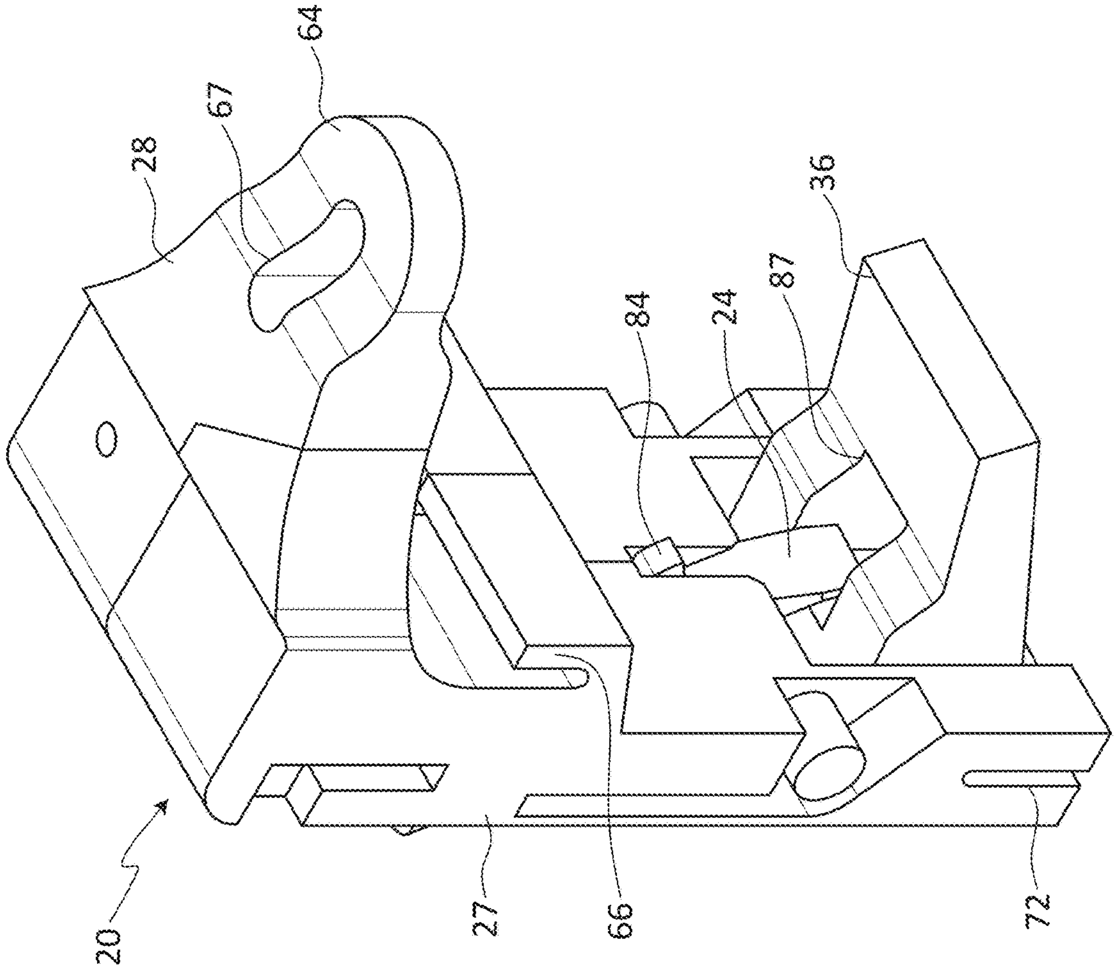
FIG. 3 is a front perspective view of the receptacle lid lock of FIGS. 1A-1D with the shroud removed.
Figure 4:
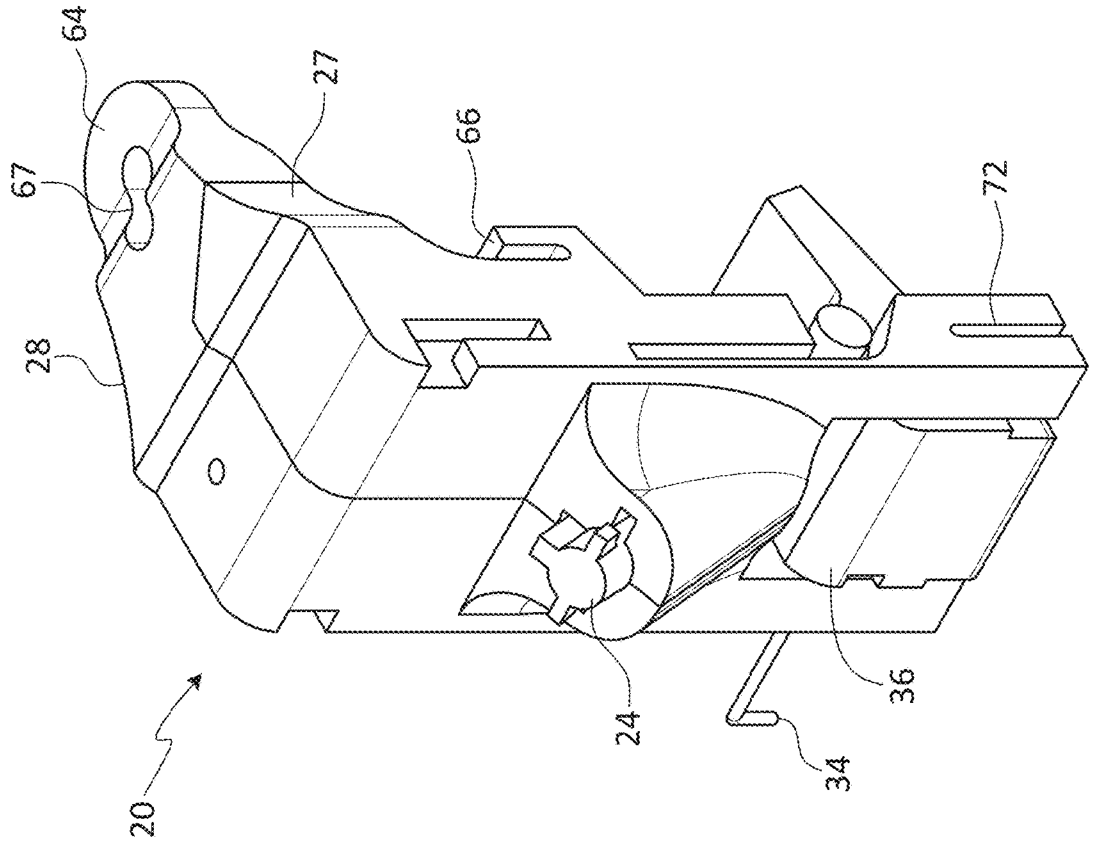
FIG. 4 is a rear perspective view of the receptacle lid lock of FIG. 3.
Figure 5:
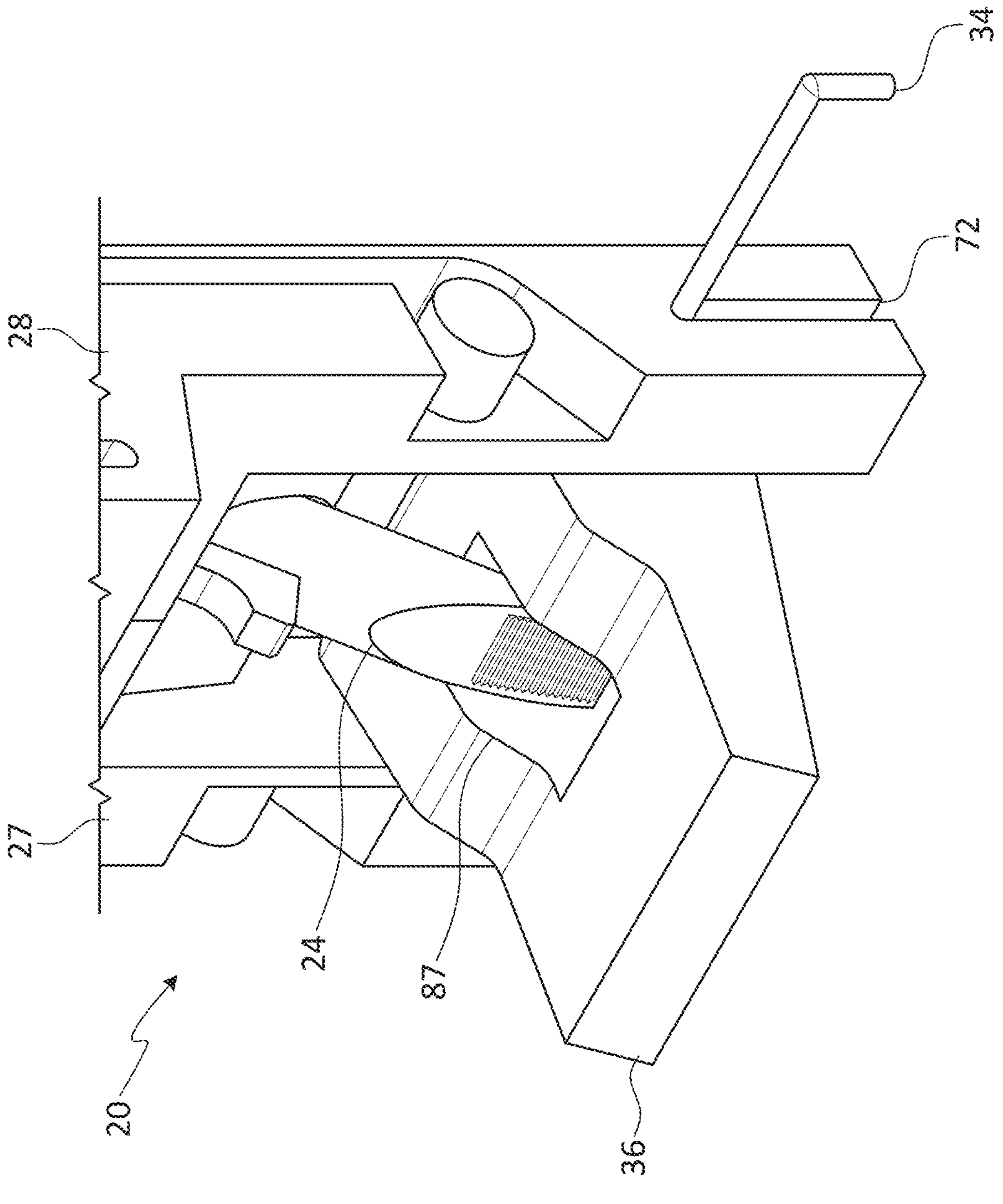
FIG. 5 is a perspective view of a portion of the receptacle lid lock of FIG. 3.
Figure 6:
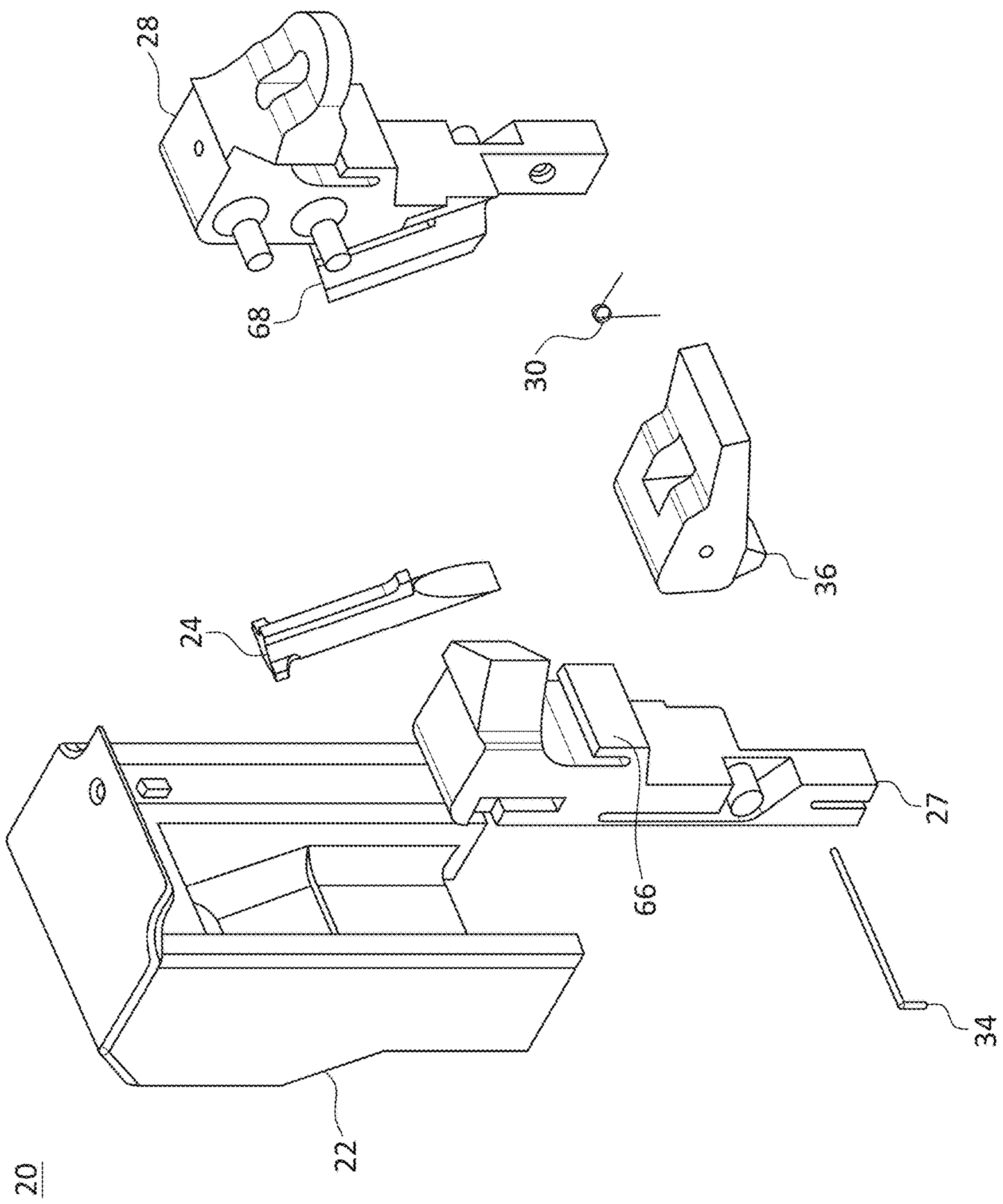
FIG. 6 is an exploded view showing components of the receptacle lid lock of FIGS. 1A-1D.

FIGS. 1A-1D and 2-5 illustrate a lid lock 20 for locking a lid of a receptacle according to example embodiments, and FIG. 6 shows individual components of the unassembled lid lock 20. The example lid lock 20 includes a shroud 22 (shown in FIGS. 1A-1D, 2, and 6), a gravity pin 24, a frame or mount 26 including mating right 27 and left 28 sides, one or more torsion springs 30, a lower set pin (lower pin) 34, and a latch 36. FIGS. 3-5 show the frame 26, gravity pin 24, torsion spring 30, and latch 36 with the shroud 22 omitted.

The shroud 22 encases portions of the frame 26, gravity pin 24, torsion spring 30, and latch 36. In FIG. 2, for example, portions of the frame 26, gravity pin 24, torsion spring 30, and latch 36 that are encased in the shroud 22 are displayed in phantom.

The shroud 22, frame 26 (right and left sides 27, 28), latch 36, and gravity pin 24 may be made, e.g., of plastic and 3D printed. For instance, a 3D Printer Filament Impact-Resistant, ABS Plastic, 1.750 mm (1 kg) can be used. However, one or more components may instead be constructed using other suitable materials and/or other manufacturing methods.

In some example lid locks, the 3D printer filament is Ultem 1010 Resin. Ultem 1010 Resin exhibits high structural integrity, e.g., tensile strength, allowing the locking mechanism provided by the lid lock 20 to withstand high forces, e.g., up to 150 lbf, coming towards the lid lock in the case of tipping. Other example filaments include PETG or ASA plastic. ASA plastic exhibits UV resistant properties, allowing for it to not warp or crack under prolonged sun exposure. Example materials resist significant expansion or contraction, e.g., a less than 1% change in the size of the material, in extreme weather conditions, e.g., temperatures as low as −50° F. and as high as 100° F. This helps the example lid lock 20 to avoid temperature related failure in use.

The frame (mount) 26 includes the right and left portions 27, 28, which can be matingly connected to one another. For assembling the frame 26 to surround the gravity pin 24, the left portion 28 (FIGS. 8A-8E) may include, for instance, extruding pins 32, and the right portion 27 (FIGS. 8F-8K) may include, for instance, receiving openings (e.g., holes) 33 to receive the extruding pins for attachment (or vice versa).

The latch 36 is provided with a substantially central opening (e.g., hole) 87 for receiving the gravity pin 24. The gravity pin 24, for instance, can be 3D printed as one piece, and the right and left portions 27, 28 of the example frame 26) can mate to one another to surround the gravity pin.

Figure 12:
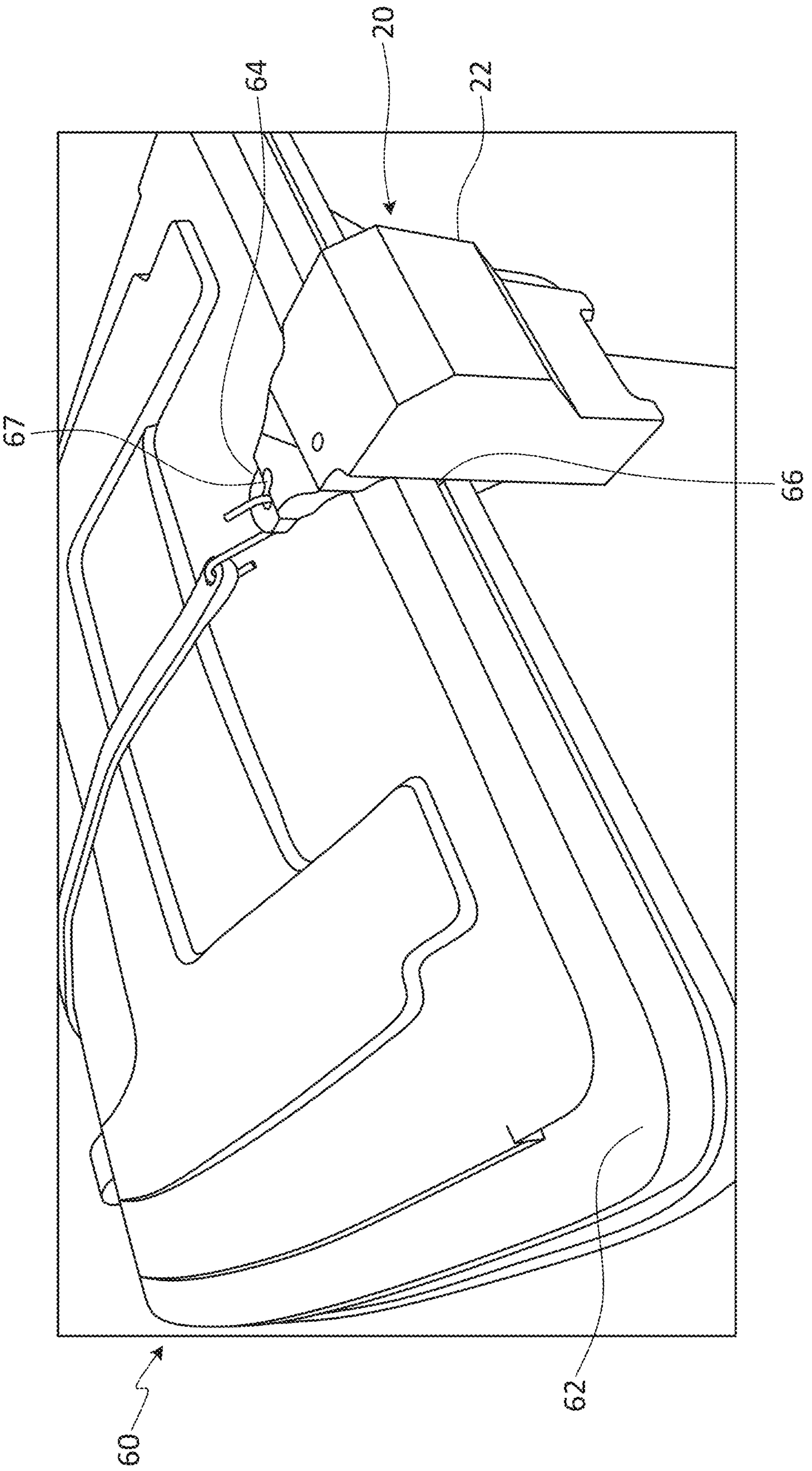
FIG. 12 shows a perspective view, respectively, of the receptacle lid lock of FIGS. 1A-1D, including a shroud, mounted to a receptacle.
Figure 13:
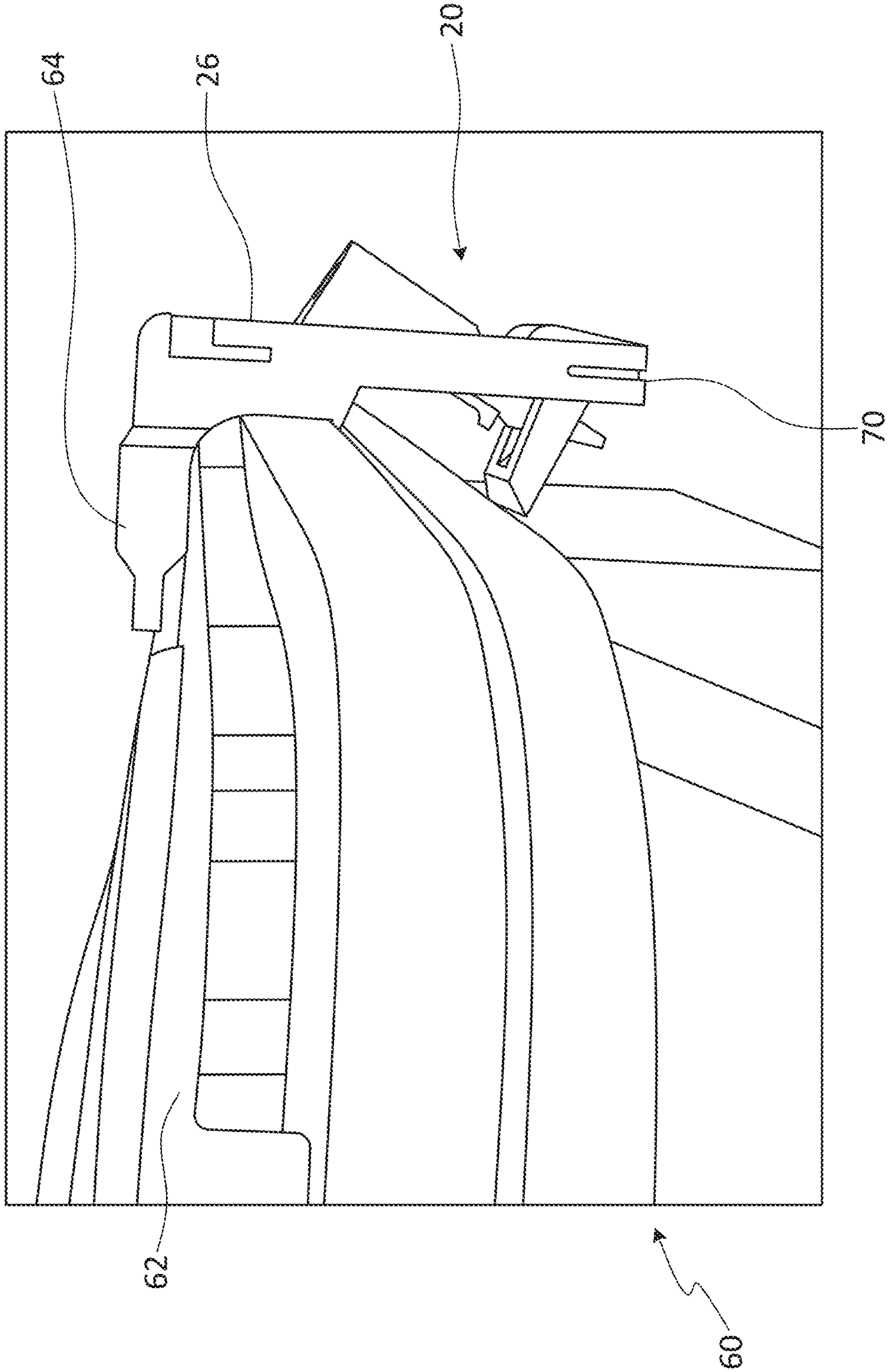
FIGS. 13-14 shows side, and elevated views, respectively, of the receptacle lid lock of FIGS. 1A-1D mounted to a receptacle, where the shroud is omitted.
Figure 14:
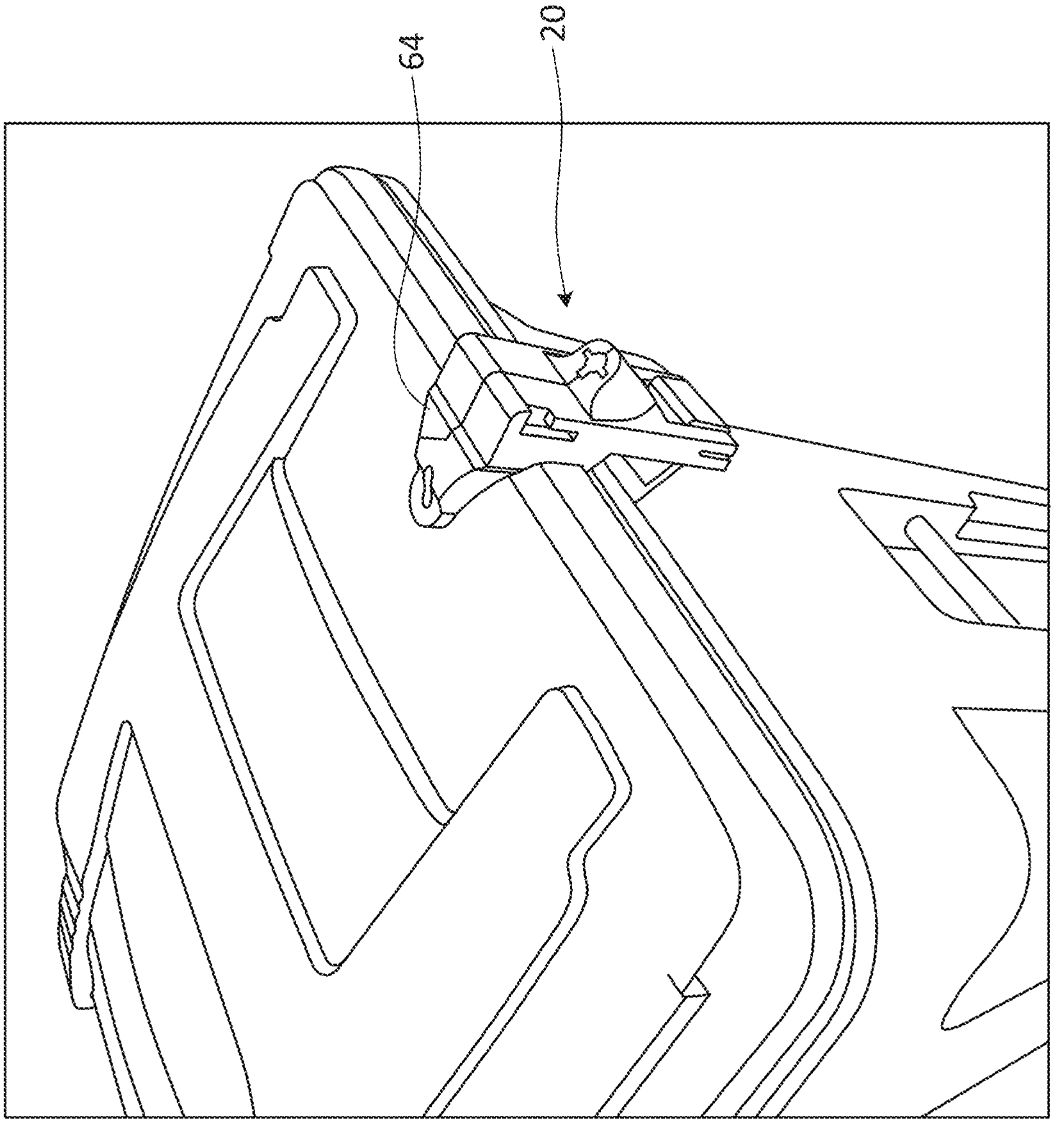
Figure 15:
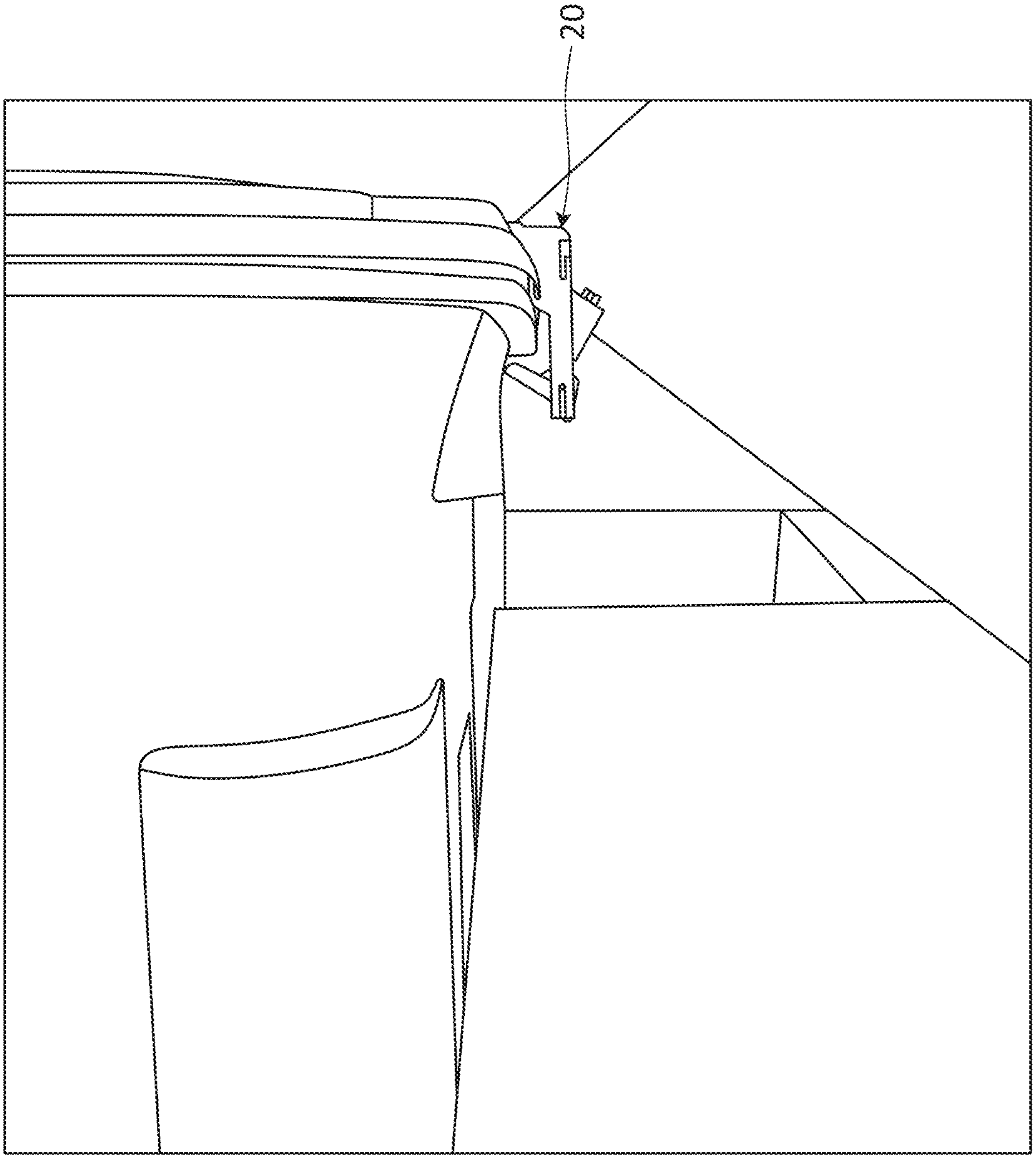
FIG. 15 is a side view the receptacle lid lock of FIGS. 13-14 mounted to the receptacle, where the receptacle is tipped.

The assembled frame 26 including connected right and left portions 27, 28 includes an upper frontward projecting surface 64 and a frontward projecting lower lip or hook (lower lip) 66. As shown in FIGS. 12-15, for connecting to a receptacle 60, the lower lip 66 can wrap around a front lip of a receptacle lid 62 so that the receptacle lid is disposed between the lower lip 66 and an upper portion of the frame 26. FIG. 12 shows the lid lock 20 with the protective shroud 22, and FIGS. 13-15 show the lid lock without the shroud. The projecting surface 64 extends past (e.g., further frontward than) the lower lip 66 for being positioned over a top surface of the receptacle lid 62 so that a portion of the receptacle lid is held between the lower lip and the projecting surface.

The projecting surface 64 includes a connector for a weather resistant strap 40 such as an opening 67 (e.g., disposed in the right portion 28) that can accommodate the an external weather resistant strap (e.g., receive a hook attached to the strap). The strap, such as but not limited to a rubber tie down, e.g., an all-weather EPDM rubber tie down 40 having opposing hooks, can tension from the receptacle 60, e.g., from the receptacle's handle (FIGS. 12-15) to the projecting surface 64. This can help hold the lid lock 20 in place against the receptacle lid 62. The frame 26 can thus be connected to the receptacle lid 62 and can be movable with the receptacle lid if the lid lock's 20 locking mechanism is disengaged.

The frame 26 includes a pin slot 68 extending in a rearward direction therefrom for accepting the gravity pin 24 so that it can slide within the pin slot. The pin slot 68, which is cooperatively formed by openings of the right 27 and left 28 frame portions, defines an angled (e.g., from vertical) opening for receiving a main shaft 80 of the gravity pin 24.

Figure 10A:
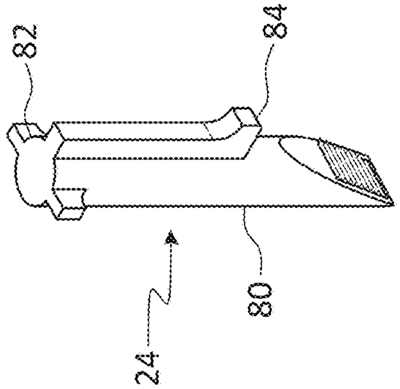
FIGS. 10A-10E show an example gravity pin of the receptacle lid lock of FIGS. 1A-1D.
Figure 10B:
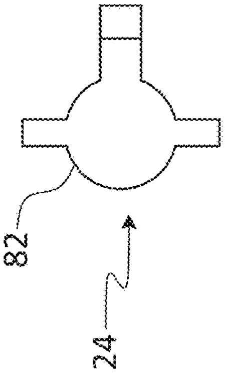
Figure 10C:
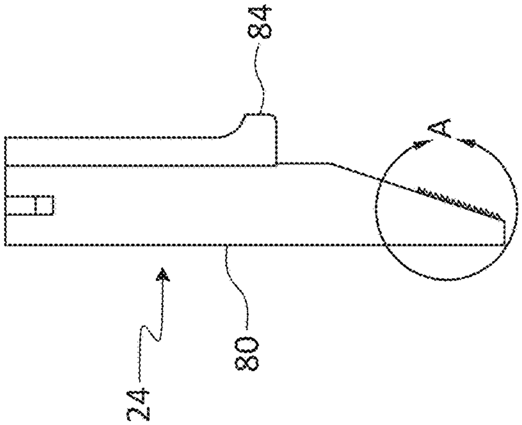
Figure 10D:
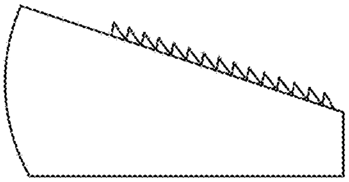
Figure 10E:
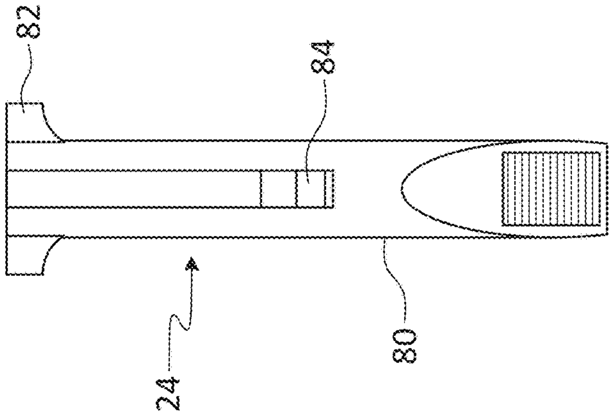
Figure 11A:
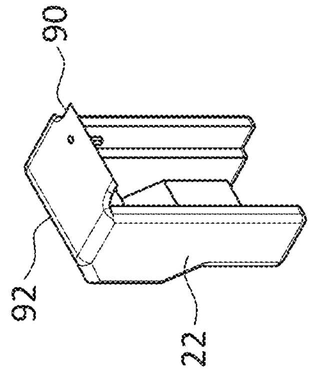
FIGS. 11A-11G show an example shroud of the receptacle lid lock of FIGS. 1A-1D.
Figure 11B:
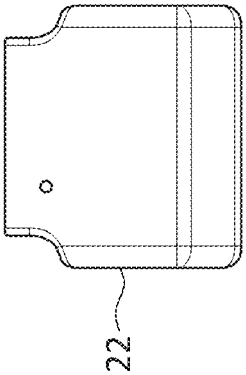
Figure 11C:
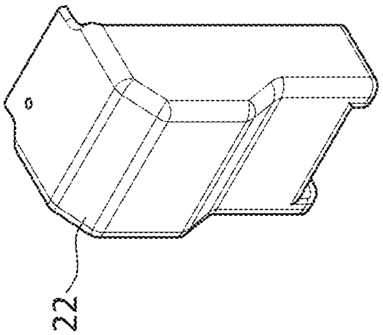
Figure 11D:
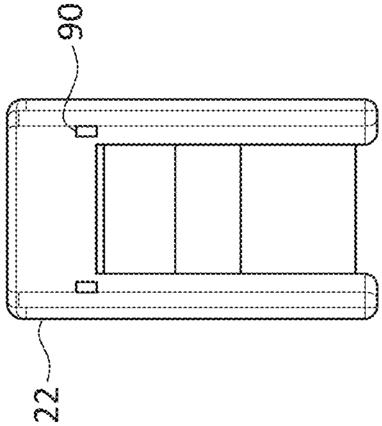
Figure 11E:
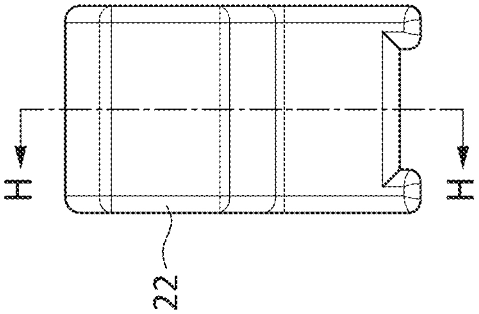
Figure 11F:
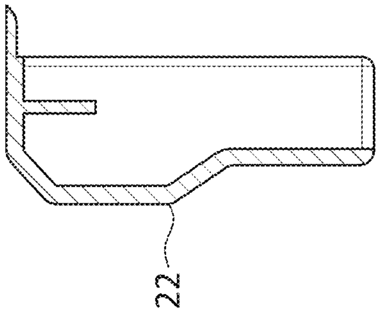
Figure 11G:
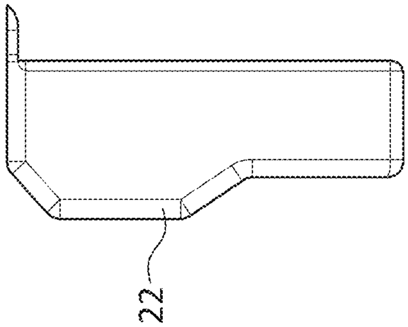

A head 82 of the gravity pin 24 (FIGS. 10A-10E) is disposed at an upper end of the main shaft 80. A lower hook 84 is disposed on a front of the main shaft having a frontward extending surface to prevent the gravity pin 24 from sliding out of the frame 26 when the lid lock 20 is inverted. An extrusion prevents the gravity pin 24 from swinging inwards but allows the gravity pin to slide open. A front facing, tapered surface on a lower portion of the main shaft 80 can include raised portions (FIGS. 10C-10E).

The latch 36 (FIGS. 9A-9D) includes an opening, e.g., a cutout 87, for accommodating the gravity pin 24 at least partially therethrough. The cutout 87 includes a rearward facing curved surface 88 that can allow the gravity pin 24 to smoothly move out of the way when the lid lock 20 is closing, preventing the latch 36 from pinching the gravity pin when the lid lock is automatically closing. In the assembled lid lock 20 the latch 36 is attached to the frame 26 and protrudes outwards. Additionally, a slot 72 provided on a lower leg of the right frame portion and an opening (e.g., hole) provided on a lower leg of the left frame portion are provided for accepting a lower pin 34.

As shown in FIGS. 13-14, the latch 36 engages the receptacle 60 underneath a portion of the receptacle (e.g., underneath a front lip, flange, or rim), which is below the top of the receptacle and thus below the opening between the top of the receptacle and the receptable lid 62, holding the lid lock 20 to the receptacle 60 and keeping the receptacle lid shut.

Generally, there are two ways for the receptacle lid 62 to open using the example lid lock 20. The latch 36 can be pressed, which pushes the gravity pin 24 upward. This allows the receptacle lid 62 to open instead of being forced to hold the lid closed. The gravity pin 24 is moved out of the way because the latch 36 pushes it, allowing the receptacle lid 62 to open without being impeded by the latch.

Another way the lid 62 opens is when the receptacle 60 is lifted and inverted in the direction of the front of the receptacle bin. This is because the gravity pin 24 in the assembled lid lock 20 is only allowed to move in one direction. The direction it swings open moves out of the way from keeping the latch 36 closed. Due to this, the latch 36 now has no force keeping it fixed in one position.

Figure 7:
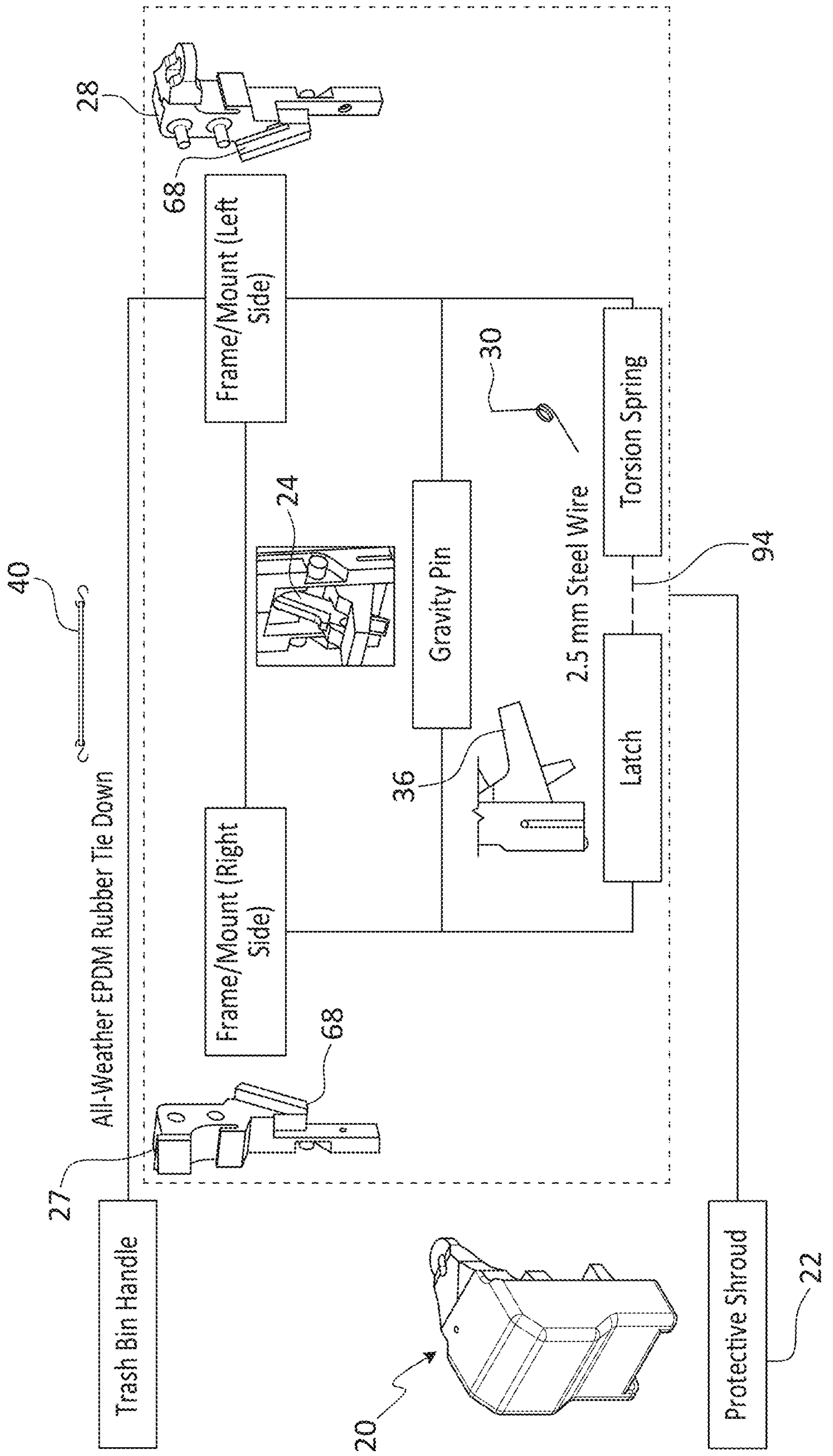
FIG. 7 shows an example assembly method for the receptacle lid lock of FIGS. 1A-1D.
Figure 8C:
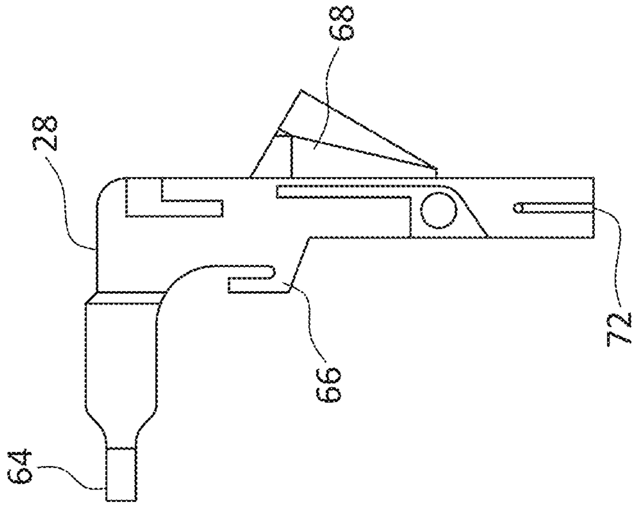
FIGS. 8A-8E show a left portion, of an example frame (or mount) for the receptacle lid lock of FIGS. 1A-1D.
Figure 8B:
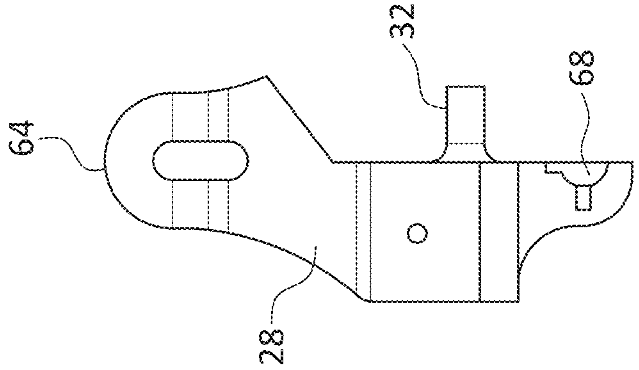
Figure 8A:
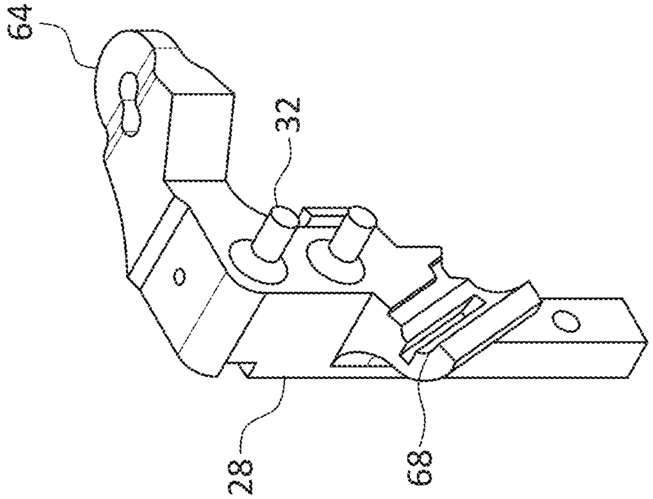
Figure 8F:
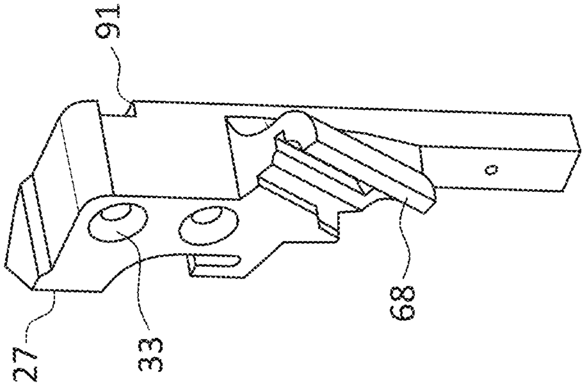
FIGS. 8F-8K show a right portion of an example frame (or mount) for the receptacle lid lock of FIGS. 1A-1D.
Figure 8E:
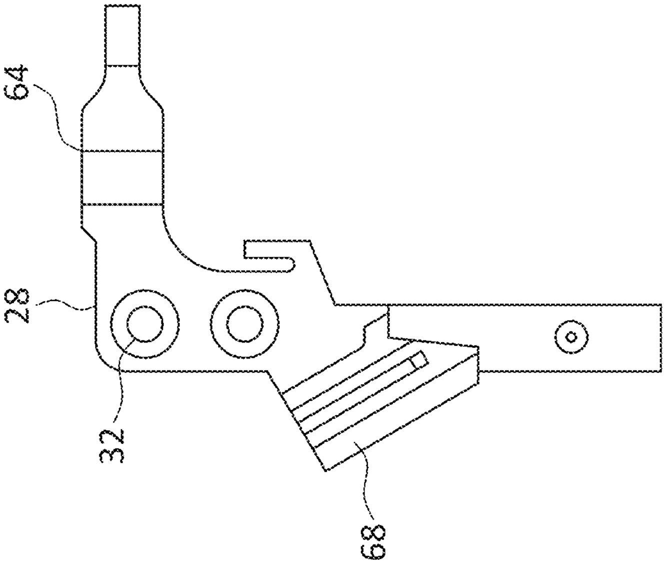
Figure 8D:
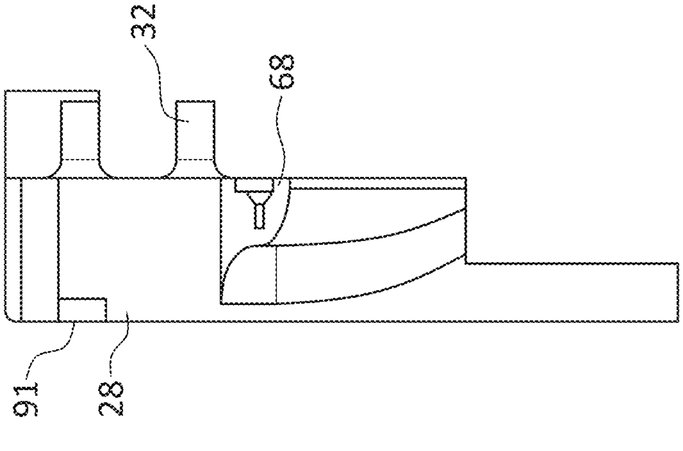
Figure 8G:
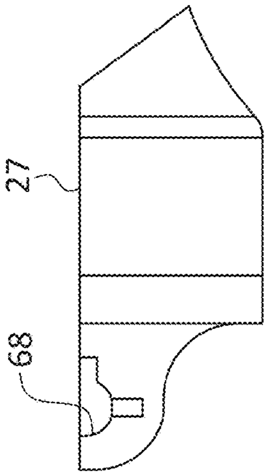
Figure 8H:
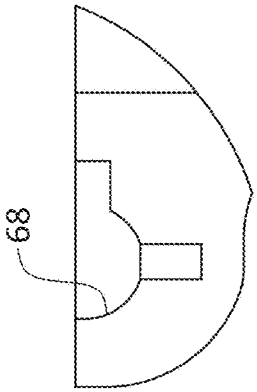
Figure 8I:
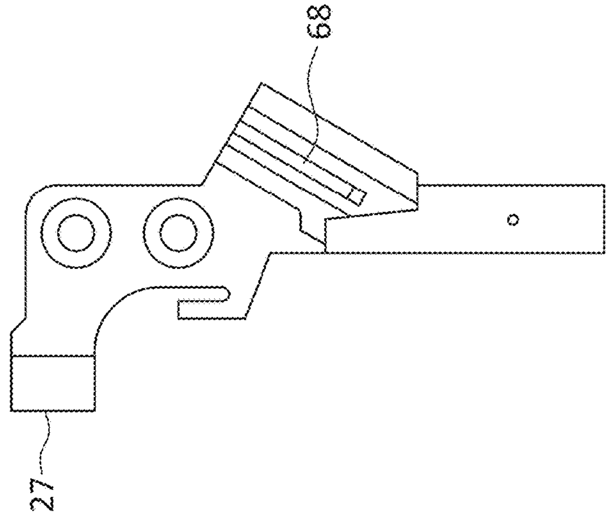
Figure 8J:
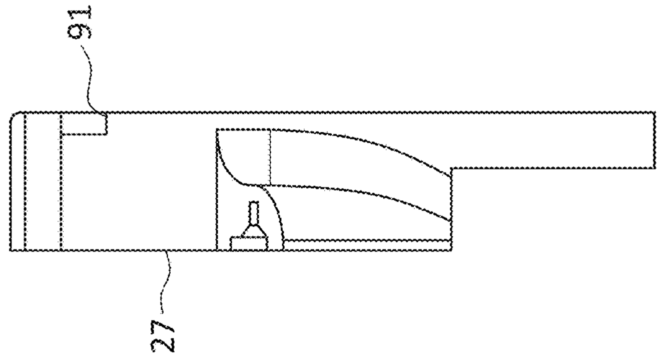
Figure 8K:
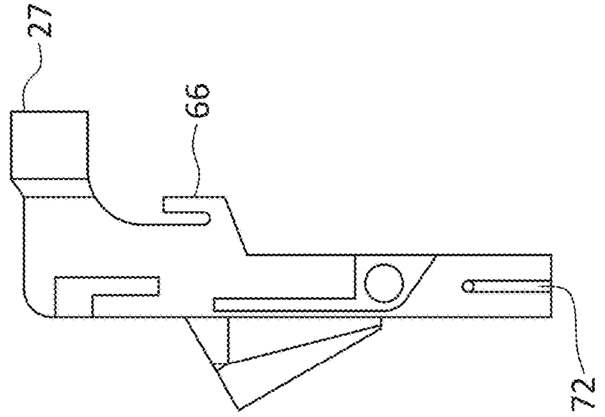
Figure 9A:
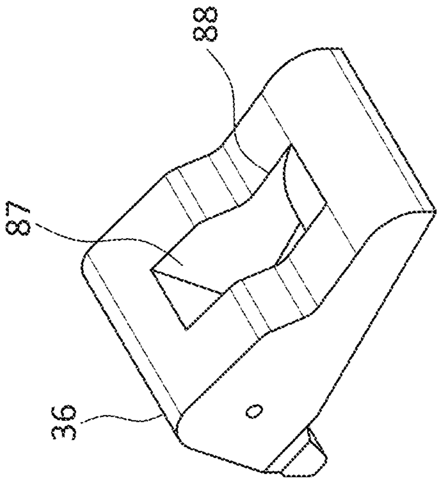
FIGS. 9A-9D show an example latch of the receptacle lid lock of FIGS. 1A-1D.
Figure 9B:
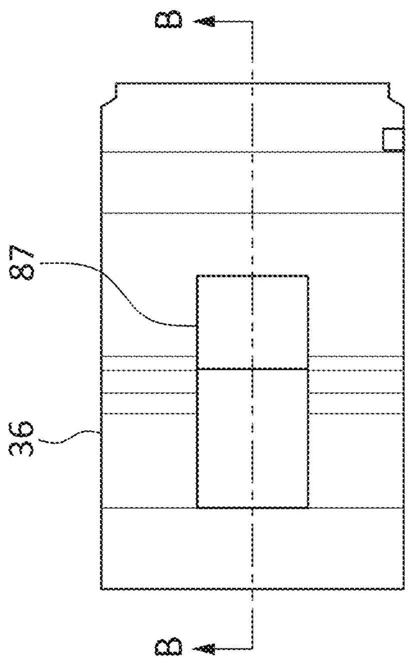
Figure 9C:
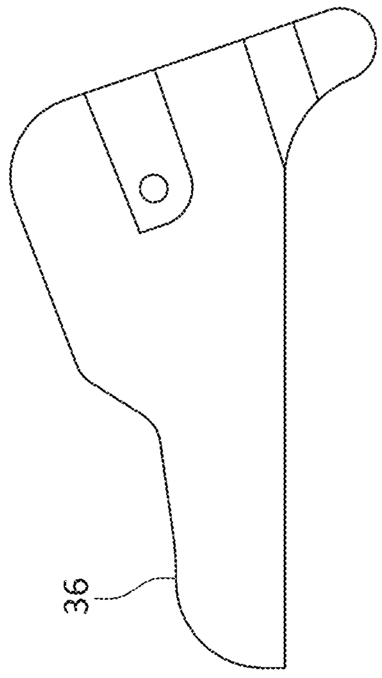
Figure 9D:
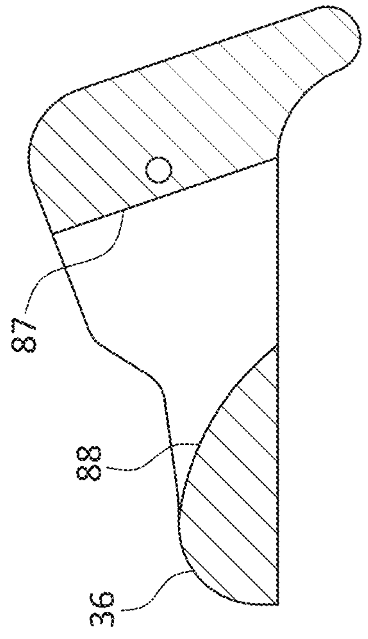

In an example lid lock 20 assembly, as illustrated by the arranged components in FIG. 7, the gravity pin 24 is placed in between the right 27 and left 28 frame portions in the opening 68 to enclose the gravity pin. For instance, the two extruded pins 32 of the left frame half 28 can be lined up on the left half of the frame 26 with the two holes 33 on the right half 27 and pushed together once the gravity pin is lined 24 up with the hole 68 it slides through.

The torsion spring 30 is placed in the frame 26, and the latch 36 is mounted into the spring. Example torsion springs 30 include 90° Left Hand Wound torsion springs. A wire, e.g., steel wire 94, can be placed through all lower sections. For instance, the torsion spring 30 can slide into respective holes at the bottom of the right and left halves 27, 28 of the now-connected frame 26. The latch 36 then slides from the front of the frame 26 backwards towards the gravity pin 24. With the spring 30 lined up on the respective tracks they are pushed until the end of the springs slide into the respective holes on the latch.

The shroud 22 (FIGS. 1A-1D and 11A-11G) can be 3D printed with connectors such as but not limited to tabs 90 on the sides and on top to attach to the frame 26 to cover (at least partially) the gravity pin 24. The housing (shroud) 22 can then be placed over the frame 26, securing the lid lock 20. For example, the tabs 90 on the shroud 22 can be lined up with tracks 91 cut out on the frame 26, and it is slid down until the tab on top snaps into place. A securing fastener, e.g., a screw, can then be tightened onto the top of the frame 26 to hold the shroud 22 in place.

In an example application, as shown in FIGS. 12-15, the receptacle lid lock 20 mounts to a receptacle 60, e.g., a trash can, by wrapping around the front lip of the receptacle lid 62 of the trash can and extending (at least partially) over the top, allowing for a snug fit. It is firmly kept in place with the weather resistant strap 40 that inserts through the top portion and wraps around the can handle.

The example locking mechanism in the lid lock 20 keeps the receptacle 60 closed when the latch 36 motion interferes with the lower portion of the receptacle. The latch 36 is prevented from moving down to unlock the receptacle 60 when the gravity pin 24 is in place. The gravity pin 24 remains in place in all orientations except while being dumped, e.g., by a refuse collector. This is achieved due to the angle of the pin slot 68, for example 30 degrees from vertical (or more generally between 15 and 45 degrees), matching the point at which the receptacle lid 62 would typically open when dumped. The example receptacle lid lock 20 is able to automatically apply due to the geometry of the example latch cut out 87 and gravity pin 24. This allows for free movement of the latch 36 in the vertical direction even while the gravity pin 24 is in place.

To open the receptacle intentionally, the user pushes the latch 36. This moves the gravity pin 24 out of the way of the latch 36, preventing the latch from interfering with movement of the trash can lid 62.

The lid lock 20 can be built with the housing (shroud 22) protecting the internal components, so that no part of such components substantially protrudes outwards in a manner that could cause harm, e.g., as a projectile if the lid lock 20 were to break. Providing the example housing 22 as separate from the other components in example embodiments allows easy replacement. This is useful, for instance if the housing 22 cracks or yields, while protecting the working components inside.

Further, the example housing 22 can be built with sufficient strength to withstand possible forces that the lid lock 20 or the receptacle 60 would undergo, and if anything were to break, it would be the housing 22 first to avoid damage (or launching) of internal components, even if the receptacle 60 falls violently towards the ground. This is useful since the lid lock 20 is used on the outside of the receptacle 60, where the contents (e.g., trash) can would fall on if it landed on that side. Proper sizing and installation of the example tie down 40, (e.g., bungee cord), for instance not stretching the cord past its limit, improves safety when stretching the cord to a proper tension for strapping the example locking mechanism down to the receptacle 60.

Example lid locks 20 provide one or more of the following benefits:

- A universal fit can be provided to fit receptacles 60 (e.g., trash cans) of a similar model: example receptacles currently in widespread use include but are not limited to residential 96 gal trash can models manufactured by Toter, Uline, and Rubbermaid. The trash can model may change with new refuse contractors or if the contractor upgrades cans. An example lid lock 20 can be configured to fit the most common receptacles, which is useful even if refuse companies change. This also saves costs to reuse the lid lock 20 product by avoiding a redesign for different cans.
- The lid lock 20 can withstand lift force from wind and sideways force when receptacles 60 are blown over: To accommodate common weather conditions and resulting issues with existing cans, an example lid lock 20 can be functional in winds up to 70 mph, allowing the receptacle lid 62 to stay closed in high wind situations to prevent receptacle contents from flying around.
- Example lid locks 20 can be configured through choice of materials and design to withstand high forces, e.g., 150 lbs of force, before failure. This is significant as receptacle contents (e.g., trash) will apply pressure on the receptacle lid 62 while tipped, so the lid lock 20 must stay closed under the force of the trash on the receptacle lid.
- An example lid lock 20 can release when the receptacle 60 is inverted. This allows the receptacle 60 to dump in accordance with current collection methods. In example embodiments, the receptacle 60 can begin opening at 150 degrees from vertical upright, but stays closed in almost all orientations except inverted. In an example application, for a refuse company to successfully dump the can it should begin opening just before 180 degrees to ensure all trash is released.
- Example lid locks 20 need not interfere with a normal trash collection process or alter the cans, which may be the property of a contractor. Further, example lid locks 20 can be used without being invasive toward the trash can (no permanent impact).

Example lid locks 20 are easy to use and can avoid hazards such as finger-pinch hazards to users. When the user needs to throw trash away, the example lid lock 20 allows the user to interact with the lid lock, unlocking the lid lock and allowing the receptacle lid to open. Once the trash is thrown away, the receptacle lid can be dropped as usual, in which the lid lock 20 can latch by itself when the receptacle lid 60 becomes shut.

- Protection provided by the lid lock 20 housing 22 protects users and others. An example lid lock 20 can be provided without pinch points, hard corners, large numbers of exposed parts, etc. Further, example lid locks 20 can engage automatically without user input, avoiding the need for residents to remember to engage the lid locks.
- Example lid locks 20 can be easily attached and removed from the receptacle 60 with a minimal number of steps. Clips can be reused if the receptacle 60 type is changed.
- Example lid locks 20 can withstand and function in extreme weather conditions, e.g., extreme cold, high winds, hail, rapid temperature changes (e.g., between 120 (F) to −50 (F)).
- Example lid locks 20 can be made inexpensively, with a small number of components.

Any of the above aspects and embodiments can be combined with any other aspect or embodiment as disclosed here in the Summary, Figures and/or Detailed Description sections.

As used in this specification and the claims, the singular forms "a," "an" and "the" include plural referents unless the context clearly dictates otherwise.

Unless specifically stated or obvious from context, as used herein, the term "or" is understood to be inclusive and covers both "or" and "and".

Unless specifically stated or obvious from context, as used herein, the term "about" is understood as within a range of normal tolerance in the art, for example within 2 standard deviations of the mean. About can be understood as within 20%, 19%, 18%, 17%, 16%, 15%, 14%, 13%, 12%, 11%, 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Unless specifically stated or obvious from context, as used herein, the terms "substantially all", "substantially most of", "substantially all of" or "majority of" encompass at least about 90%, 95%, 97%, 98%, 99% or 99.5%, or more of a referenced amount of a composition.

The entirety of each patent, patent application, publication and document referenced herein hereby is incorporated by reference. Citation of the above patents, patent applications, publications and documents is not an admission that any of the foregoing is pertinent prior art, nor does it constitute any admission as to the contents or date of these publications or documents. Incorporation by reference of these documents, standing alone, should not be construed as an assertion or admission that any portion of the contents of any document is considered to be essential material for satisfying any national or regional statutory disclosure requirement for patent applications. Notwithstanding, the right is reserved for relying upon any of such documents, where appropriate, for providing material deemed essential to the claimed subject matter by an examining authority or court.

Modifications may be made to the foregoing without departing from the basic aspects of the invention. Although the invention has been described in substantial detail with reference to one or more specific embodiments, those of ordinary skill in the art will recognize that changes may be made to the embodiments specifically disclosed in this application, and yet these modifications and improvements are within the scope and spirit of the invention. The invention illustratively described herein suitably may be practiced in the absence of any element(s) not specifically disclosed herein. Thus, for example, in each instance herein any of the terms "comprising", "consisting essentially of", and "consisting of" may be replaced with either of the other two terms. Thus, the terms and expressions which have been employed are used as terms of description and not of limitation, equivalents of the features shown and described, or portions thereof, are not excluded, and it is recognized that various modifications are possible within the scope of the invention. Embodiments of the invention are set forth in the following claims.

A number of embodiments of the invention have been described. Nevertheless, it can be understood that various modifications may be made without departing from the spirit and scope of the invention. Accordingly, other embodiments are within the scope of the following claims.

What is claimed is:

1. A lid lock for a lid of a receptacle, the lock comprising: a gravity pin; a torsion spring; a lower pin; and a latch; wherein the latch includes a cutout for accommodating the gravity pin, and the latch protrudes outwards to hold the lid lock to the receptacle and retain the lid in a closed (shut) position on the receptacle unless the gravity pin is moved; further comprising: a frame surrounding the gravity pin and slidingly accommodating the gravity pin therein; wherein the frame includes an upper frontward projecting surface and a frontward projecting lower lip, wherein the frontward projecting lower lip wraps around a front lip of a receptacle lid, and wherein the upper frontward projecting surface extends at least partially over a top surface of the receptacle lid; wherein the upward frontward projecting surface comprises a connector for accommodating a weather resistant strap.

2. The lid lock of claim 1, wherein the receptacle comprises a trash can.

3. The lid lock of claim 1, wherein the gravity pin comprises a sliding pin.

4. The lid lock of claim 1, wherein one or more of the gravity pin, the frame, or the latch is 3D printed.

5. The lid lock of claim 1, wherein the frame includes a pin slot therein for accommodating the gravity pin;

wherein the pin slot is disposed within the frame at an angle of between 15 and 45 degrees From a vertical axis of the frame.

6. The lid lock of claim 5, wherein the frame comprises left and right portions that are assembled to one another to define the pin slot.

7. The lid lock of claim 6, wherein the latch is disposed within the assembled frame, and wherein the torsion spring is coupled to the latch.

8. The lid lock of claim 1, further comprising: a shroud attached to the frame to cover the gravity pin, and which substantially encases the frame, gravity pin, torsion spring, and latch.

9. The lid lock of claim 1, wherein the frame comprises a pin slot therein for accommodating the gravity pin; and wherein the gravity pin prevents the latch from swinging downward unless the gravity pin is moved.

10. The lid lock of claim 9, wherein the gravity pin includes a protrusion disposed under the pin slot for preventing the pin slot from falling out of the pin slot if the lid lock is completely inverted.

11. A lid comprising a lid lock of claim 1.

12. A receptacle comprising a lid lock of claim 1.

13. A method for operating a lid lock to lock a receptacle lid, the lid lock comprising a frame, a gravity pin, a torsion spring, a lower pin, and a latch, wherein the latch includes a cutout for accommodating the gravity pin, and the latch protrudes outwards, the method comprising:

positioning a projecting portion of the frame over the receptacle lid and a lower lip of the frame underneath the receptacle lid;

positioning the latch underneath a portion of the receptacle below the lid, wherein the gravity pin is slidingly disposed within the frame and engages the latch to hold the latch underneath the portion of the receptacle;

wherein the latch and the frame together hold the lid lock to the receptacle and retain the lid in a closed (shut) position on the receptacle unless the gravity pin is moved, and the method comprises coupling a housing to the frame, wherein the housing substantially covers the frame, gravity pin, torsion spring, and latch.

14. The method of claim 13, further comprising pressing the latch, wherein said pressing the latch moves the gravity pin and allows the receptacle lid to open.

15. The method of claim 13, wherein the gravity pin is only allowed to move along one direction within the frame.

16. The method of claim 15, further comprising: lifting the receptacle to invert it in the direction of the front of the receptacle; wherein the gravity pin moves to release the latch.

* * * * *